(12) United States Patent
Plantan et al.

(10) Patent No.: US 6,223,647 B1
(45) Date of Patent: May 1, 2001

(54) BRAKE ACTUATOR AND METHOD OF FORMING SAME

(75) Inventors: Ronald S. Plantan, Charlotte, NC (US); James D. Goates, Cloverdale, CA (US); Duane L. Angeli, Cloverdale, CA (US); Greg W. Jensen, Cloverdale, CA (US); Graydon J. Choinski, Harrisburg, NC (US)

(73) Assignee: Indian Head Industries, Inc., Charlotte, NC (US)

( * ) Notice: Subject to any disclaimer, the term of this patent is extended or adjusted under 35 U.S.C. 154(b) by 0 days.

(21) Appl. No.: 09/189,041

(22) Filed: Nov. 9, 1998

(51) Int. Cl.[7] ........................................ F16J 13/00
(52) U.S. Cl. .................. 92/63; 92/128; 29/516; 403/282
(58) Field of Search ................. 29/516; 92/63, 92/128, 169.1; 403/279, 282

(56) References Cited

U.S. PATENT DOCUMENTS

| | | | |
|---|---|---|---|
| 1,329,479 | * | 2/1920 | Savon ..................................... 29/516 |
| 2,487,512 | * | 11/1949 | Berger .................................... 29/516 |
| 2,954,246 | * | 9/1960 | Totah et al. ............................ 29/516 |
| 3,020,094 | | 2/1962 | Murty et al. . |
| 3,083,698 | | 4/1963 | Price et al. . |
| 3,182,566 | | 5/1965 | Berg et al. . |
| 3,630,093 | | 12/1971 | Morse et al. . |
| 3,642,311 | * | 2/1972 | Edgemond ............................. 29/516 |
| 4,406,213 | | 9/1983 | Haar . |
| 4,729,290 | | 3/1988 | Ewald et al. ............................ 92/63 |
| 4,887,513 | | 12/1989 | Ewald et al. ............................ 92/63 |
| 5,279,325 | | 1/1994 | Kaspers . |
| 5,315,918 | * | 5/1994 | Pierce ..................................... 92/128 |
| 5,433,138 | | 7/1995 | Choinski et al. ........................ 92/63 |
| 5,676,036 | | 10/1997 | Choinski ................................. 92/63 |

FOREIGN PATENT DOCUMENTS

554050A1   1/1993   (EP) .

* cited by examiner

*Primary Examiner*—F. Daniel Lopez
(74) *Attorney, Agent, or Firm*—Howard & Howard

(57) ABSTRACT

An improved brake actuator and method of assembling a cup-shaped housing on a housing member of a brake actuator, wherein the housing member has an open end, an annular radially projecting rib adjacent to and surrounding the open end and a plurality of spaced channel-shaped transverse depressions in the radial rib extending toward the open end of the flange case, a cup-shaped metal cover including a tubular open end having an inside diameter initially less than the outside diameter of the annular radial rib of the housing member, wherein the tubular end portion of the cover is pressed telescopically over the radial rib of the housing member, thereby simultaneously deforming the tubular end portion of the cover into the channel-shaped depressions in the rib of the housing member and stretched over the radial rib, thereby preventing rotation of the cover relative to the housing member. In the preferred embodiment, the channel-shaped depressions in the radial rib include a bottom wall, an open end opening toward the end of the housing member and side walls tapering toward the open end of the depressions. The diameter of the rib measured between the bottom walls of the depressions is less than the inside diameter of the tubular end of the cover, whereby the open end and tapered side walls of the depressions channel the tubular end portion of the cover into the depressions and over the enlarged radial rib of the housing.

25 Claims, 3 Drawing Sheets

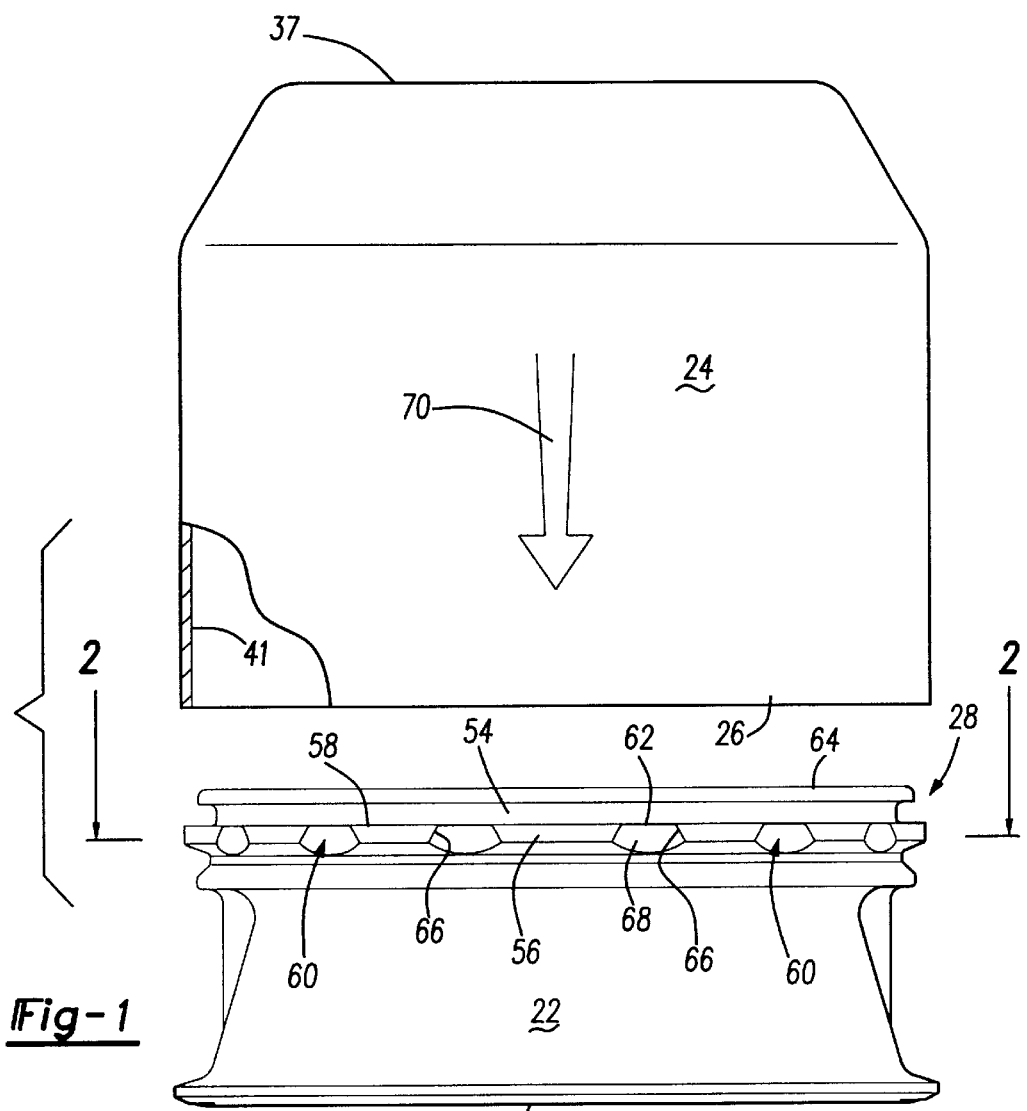
Fig-1
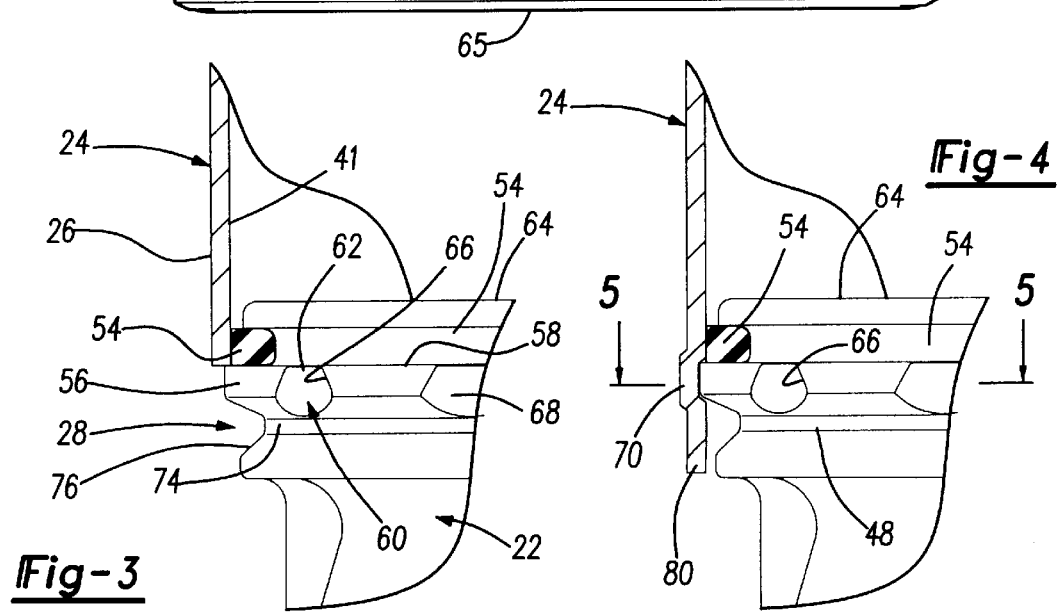
Fig-3
Fig-4

BRAKE ACTUATOR AND METHOD OF FORMING SAME

FIELD OF THE INVENTION

This invention relates to an improved brake actuator, preferably a small envelope tamper-resistant spring brake actuator which prevents rotation of the cover or head relative to the housing with improved sealing and a method of forming the improved spring brake actuator.

BACKGROUND OF THE INVENTION

Spring brake actuators of the type disclosed herein are used in combination with pneumatic brake systems on heavy vehicles including for example trucks, buses and trailers. The considerable inertial mass of these heavy-duty vehicles in combination with the high speeds at which they travel requires a braking system which responds rapidly with substantial braking power. A tandem spring brake actuator of the type disclosed in this application generally includes an H-shaped central housing member or flangecase which defines an emergency chamber on one side and a service or non-pressure chamber on the opposite side, and a power spring located in the emergency chamber which is biased against a piston which drives a push rod operably connected to the vehicle brake. When the pneumatic pressure in the spring chamber falls below a predetermined pressure or where the vehicle pneumatic pressure fails, the power spring drives the push rod to actuate the brakes, thus serving as an emergency brake for the vehicle. When the vehicle is turned off, the spring chamber also acts as a parking brake. The service chamber generally includes a push rod operable connected to the braking system of the vehicle and the push rod in the emergency chamber and the vehicle pneumatic brake system biases a flexible diaphragm in the service chamber to actuate the brakes of the vehicle. Where the spring brake actuator includes both an emergency chamber and a service chamber in tandem, the spring brake actuator is generally referred to as a "piggyback" spring brake actuator. There are generally two types of piggyback spring brake actuators. In the piston-type, the piston in the emergency chamber includes an annular seal at its outer periphery which seals against the inside surface of the cylinder case of the emergency chamber. In a diaphragm-type, commonly referred to as a dual diaphragm spring brake actuator, the emergency chamber includes a flexible diaphragm normally secured between opposed flanges of the central housing member or flangecase and the cover or head.

In certain applications, the emergency chamber is separated physically from the service chamber and the improved brake actuator of this invention may be utilized for piggyback spring brake actuators or brake actuators where the emergency chamber is separated from the service chamber. In a typical dual diaphragm spring brake actuator, the central housing member or flangecase is formed of aluminum, such as SAE 360 aluminum, and the head or cover is formed from steel, typically SAE 1008 or 1010 low carbon steel; however, the central housing member may also be formed of steel.

Because the power spring utilized in spring brake actuators is very powerful, the head of the emergency chamber must be securely attached to the housing member. In the past, the head of a dual diaphragm spring brake actuator was retained to the housing or flangecase by a bolted clamp band. In the piston-type spring brake actuator, the head is secured to the flangecase by a split metal retaining ring. More recently, various tamper-resistant brake actuators have been introduced, by the assignee of the present invention, wherein the head of the emergency chamber is permanently attached to the housing member by inelastically deforming a skirt or lip generally on the head around a radial flange of the housing member as disclosed, for example, in U.S. Pat. No. 4,960,036 assigned to the assignee of this application.

Spring brake actuators are mounted on the underside of a vehicle. Where the space available for mounting the spring brake actuator is at a premium, it is desirable to reduce the overall envelope of the spring brake actuator by eliminating the radial flanges on the housing member and the cup-shaped head. This was accomplished by forming a radial groove in the housing member and deforming the open end of the cover, which is telescopically received over the end of the housing member, into a radial groove in the housing member as disclosed in U.S. Pat. No. 5,676,036, also assigned to the assignee of the present application. The cover is then sealed to the central housing member by an annular resilient seal which is resiliently biased against the inner surface of the cover. If the cover rotates relative to the housing member, the annular seal may tear, resulting in leakage around the seal. It is also important where the brake actuator includes a breather tube to maintain the factory set alignment of the breather tube hole in the head or cover to the ports in the case. Thus, there are specific torque (antirotation) requirements in the specifications for brake actuators. Further, even where the housing is not rotated, leakage may occur around the seal because the annular seal may not be pressed tightly against the interior surface of the cup-shaped cover, particularly under extreme temperature conditions. Thus, a primary object of this invention is to prevent rotation of the cup-shaped cover relative to the housing member and improve sealing of the spring brake actuator.

SUMMARY OF THE INVENTION

As described above, the present invention relates to brake actuators of the type including a metal housing member and a cup-shaped metal cover having a tubular open end portion which is telescopically received over the housing member and retained to the housing member in sealed relation. The housing member, which is generally formed of aluminum, but may also be formed of steel, includes an open end having an external radially projecting annular rib which has a diameter greater than the internal diameter of the tubular end portion of the cover, providing an interference fit between the tubular end portion of the cover and the radial rib on the housing member. The rib includes a plurality of spaced channel-shaped transverse depressions which extend toward the open end of the housing member, each preferably having an open end. The diameter of the rib measured between the bottom wall of the opposed channel-shaped depressions is however less than the inside diameter of the cover, such that when the tubular end portion of the cover is pressed telescopically over the larger radially projecting rib of the housing member, the tubular end portion of the cover is simultaneously deformed radially inwardly into the channel-shaped depressions and stretched or expanded over the rib, thereby preventing rotation of the cover relative to the housing member and an improved seal between the cover and the housing member because the cover cannot rotate relative to the housing. In the preferred embodiment of the brake actuator of this invention, the depressions in the annular radially projecting rib include an open end facing the open end of the housing member and the side walls are tapered toward the open end, such that the depressions channel the tubular end portion of the cover into the depressions. In the most preferred embodiment, the bottom wall of the depressions are arcuate, such that the depressions smoothly channel the tubular end portion of the cover into the depressions and permit stretching or expansion of the tubular end portion of the cover over the larger radially projecting rib. This improved interference fit also solves the problem of differential expansion and retraction of the cover and the housing member under extreme temperature conditions, particularly where the cover and housing member are formed of different materials, such as aluminum and steel. As will be understood by those skilled in the art, the coefficient of expansion of steel is greater than aluminum. Where a steel cover is utilized with an aluminum housing member, the interference fit assures a tight sealed connection between the cover and the housing member under extreme variations in temperature.

As set forth above, the improved brake actuator of this invention may also be used in combination with the improved small envelope design, wherein the tubular end portion of the cover is deformed into a radial retaining groove in the external surface surrounding the free end of the housing member. In the most preferred embodiment of the tamper-resistant brake actuator embodiment of this invention, the radial projecting rib is located between the open end of the housing member and the radial retaining groove and the tubular end portion of the cover adjacent the free end is deformed into the radial retaining groove after the tubular end portion is telescopically received over the radial rib as described above. In the preferred embodiment, the radial retaining groove includes a bottom wall and outwardly tapered side walls, wherein the tubular end portion of the cover is deformed radially inwardly against the bottom wall of the retaining groove and radially outwardly to overlie the tapered side walls of the retaining groove.

The method of retaining a cup-shaped cover on a housing of a brake actuator of this invention thus includes forming a metal housing member having an open end, an annular radially projecting rib adjacent to and generally surrounding the open end and a plurality of spaced channel-shaped transverse depressions in the radial rib extending toward the open end of the housing member. The method further includes forming a cup-shaped metal cover including a tubular open end portion having an inside diameter less than an outside diameter of the annular radially projecting rib as described above. The method of this invention then includes pressing the tubular open end portion of the cover telescopically over the annual rib of the housing member, permanently deforming the covered tubular end portion radially into the spaced channel-shaped transverse depressions, thereby preventing rotation of the cover relative to the housing member. Where the channel-shaped transverse depressions in the annular radially projecting rib of the housing member include an open end and preferably side walls tapering toward the open end of the depressions, the open end and tapered side walls of the depressions channel the tubular open end portion of the cup-shaped metal cover into the depressions as the tubular open end portion of the cover is pressed telescopically over the annular rib of the housing member.

Finally, the cover is secured to the housing member preferably by deforming the tubular end portion of the cover adjacent the free end into the annular retaining groove as described above. It is important to note that the method of securing a cover on a metal housing of brake actuator of this invention may be used where the cover is formed of steel and the housing member is formed of aluminum, which is relatively fragile and subject to cracking, and wherein the diameter of the rib measured between the bottom walls of opposed depressions is initially less than the internal diameter of the tubular end portion of the cover. That is, the channel-shaped depressions channel and guide the tubular end portion of the cover into the depressions while permitting the tubular end portion to simultaneously expand over the radially projecting rib of the aluminum housing member without cracking or damage to the housing member and providing an interference fit which prevents rotation of the cover relative to the housing member and improved sealing. This is an unexpected result of the method of this invention.

Other advantages and meritorious features of the improved brake actuator and method of this invention will be more fully understood from the following description of the preferred embodiments and the drawings, a brief description of which follows.

BRIEF DESCRIPTION OF THE DRAWINGS

FIG. 1 is an exploded side elevation of one embodiment of a brake actuator illustrating a step in the method of this invention;

FIG. 3 is a partial side view with the cover in cross-section illustrating the interference fit between the tubular end portion of the cover and the radial projecting flange on the housing member;

FIG. 4 is a partially cross-sectioned side view similar to FIG. 3 with the tubular end portion of the cover telescopically received over the radial flange of the housing member;

DESCRIPTION OF THE PREFERRED EMBODIMENTS

Figure 7:
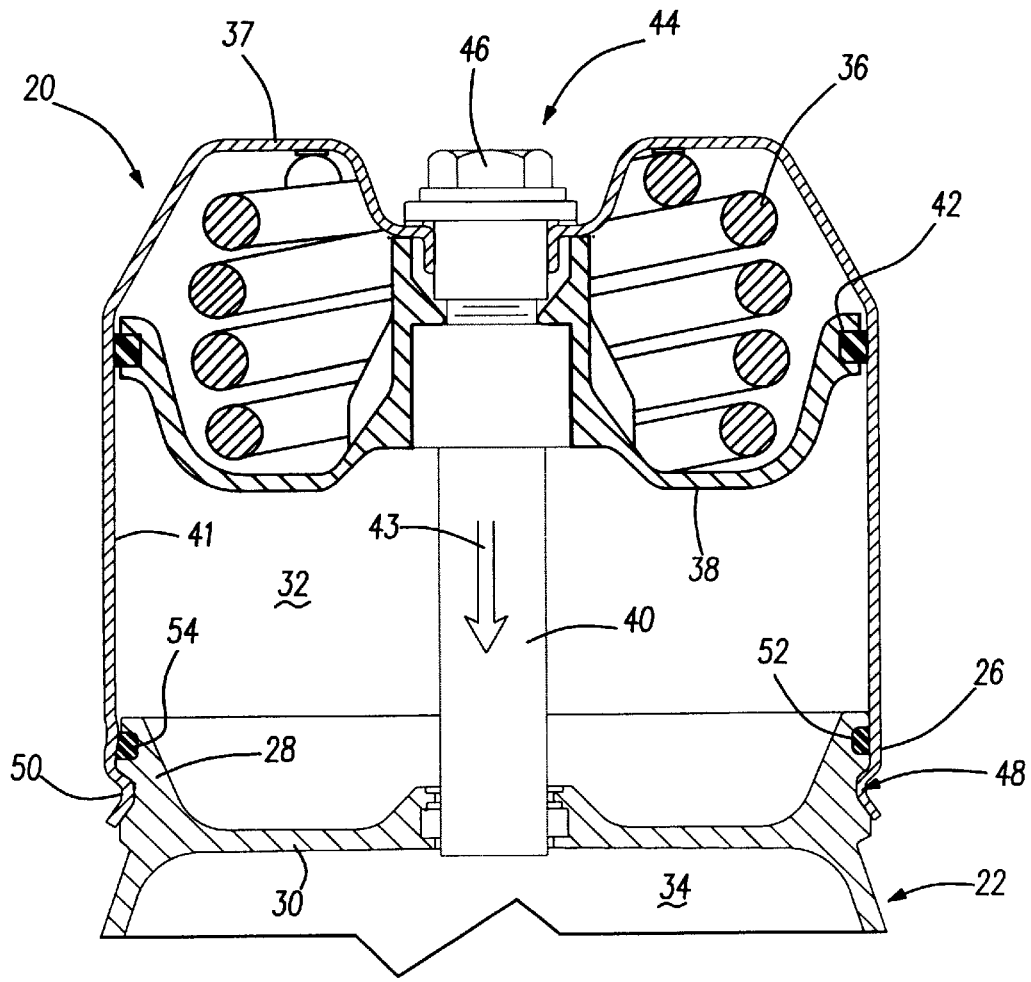
FIG. 7 is a partial side view of a typical embodiment of the brake actuator of this invention.
Figure 8:
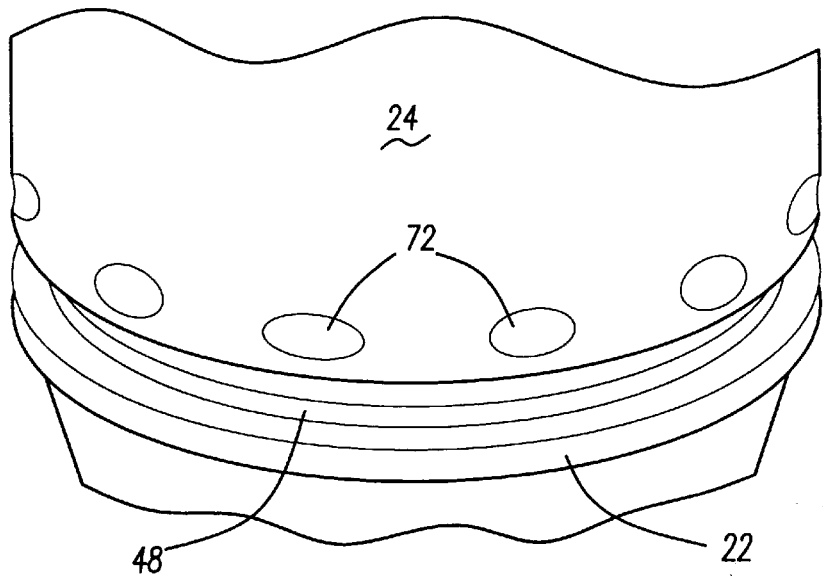
FIG. 8 is a partial elevated side view of the embodiment of the brake actuator illustrated in FIG. 1 following attachment of the cover to the housing member.

FIG. 7 illustrates components of an emergency chamber of a piggyback piston-type spring brake actuator 20 which has been formed by the method of this invention. As described above, however, the improved brake actuator and method of this invention may also be utilized with dual diaphragm spring brake actuators and brake actuators where the emergency chamber is separated from the service chamber. The spring brake actuator 20 illustrated in FIG. 7 includes a housing member 22, which in the disclosed embodiment is a central housing member sometimes referred to as a flangecase, and a cup-shaped cover 24 having a tubular open end 26 which is telescopically received over the open 28 of the housing member. In the disclosed embodiment, the housing member 22 includes a central web portion 30 which divides the spring brake actuator into an emergency chamber or spring chamber 32 and a service chamber 34. The emergency chamber includes a power spring 36 which reacts against the end 37 of the housing member and the spring piston 38. The assembly further includes a push rod 40 which is driven by the spring piston 38 in the direction of arrow 43 when the pressure in the spring chamber 32 falls below a predetermined pressure as described below. The spring piston 38 is sealed against the internal surface 41 of the cover 24 by an annular elastomeric seal 42. The disclosed spring brake actuator further includes a spring lock or lockout assembly 44 which permits caging of the power spring by rotation of bolt 46. That is, the power spring 36 may be manually compressed by the spring lockout assembly 44 as shown in FIG. 7 by rotation of bolt 46. However, the spring lockout assembly 44 does not form a part of the present invention and therefore no further disclosure is required. Further, in the disclosed preferred embodiment of the brake actuator of this invention, the open end 28 of the housing member 22 includes a radial groove 48 and the tubular open end 26 of the cover is deformed radially inwardly at 50 into the radial groove 48 to permanently seal the emergency spring chamber 32 and the power spring 36 to prevent inadvertent opening of the emergency chamber which may result in serious injury or death upon release of the power spring 36. An annular elastomeric seal 52 is received in a radial groove 54 in the exterior surface of the open end 28 of the housing member which seals the cover 24 on the housing member 22.

As will be understood by those skilled in brake actuators, the air or pneumatic pressure in the emergency chamber 32 reacts against the spring piston 38 which compresses the power spring 36 as shown in FIG. 7. When the air pressure in the emergency chamber 32 falls below a predetermined pressure or when the vehicle is turned off and the air pressure is released manually by actuating the park brake valve, the power spring 36 expands against the spring piston 38, which drives the push rod 40 in the direction of arrow 41 actuating the braking system of the vehicle. During normal braking, initiation of the braking system of the vehicle pressurizes the service chamber 34, which drives a service chamber push rod (not shown) generally coaxially aligned with the emergency chamber push rod 40 actuating the braking system of the vehicle. Having described the general components of a tamper-resistant piston-type spring brake actuator, it will be understood that the improved brake actuator of this invention may also be utilized with a resilient diaphragm spring brake actuator as disclosed, for example, in the above-referenced U.S. Pat. No. 5,676,036, a spring chamber or service chamber or where the emergency chamber is separated from the service chamber.

Figure 2:
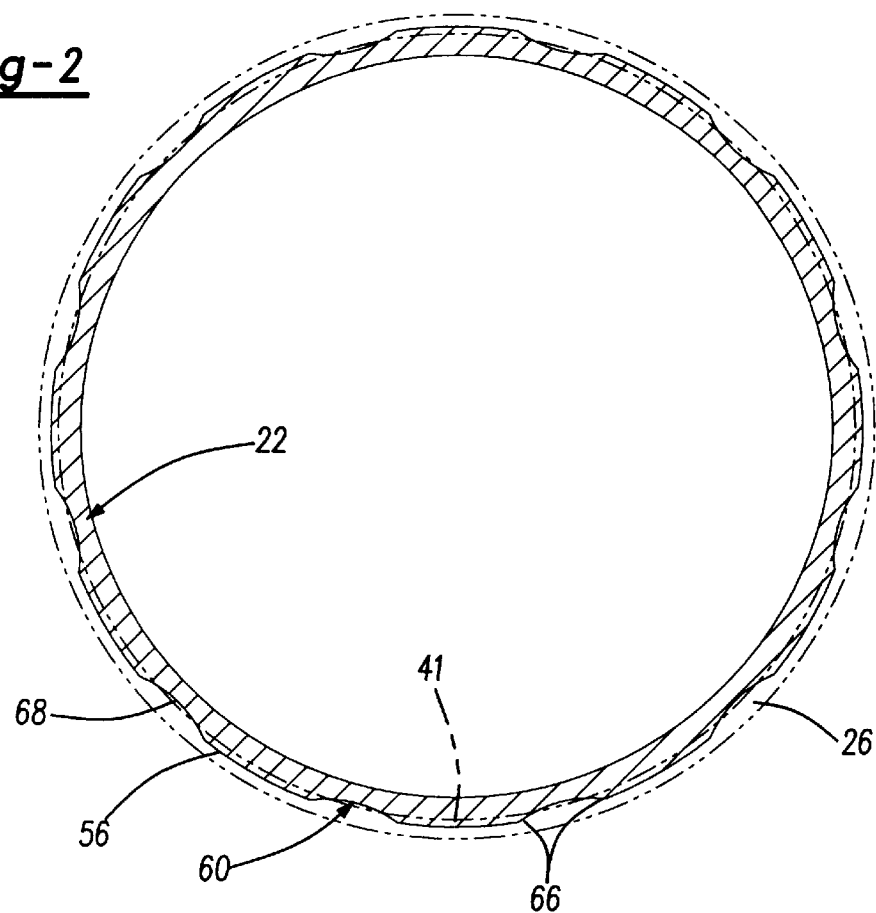
FIG. 2 is an end cross-sectional view of FIG. 1 in the direction of view arrows 2—2.

Reference should now be made to FIGS. 1 to 6 which illustrate one embodiment of the improved brake actuator and method of this invention. As best shown in FIGS. 1 and 3, the open end 28 of the housing member 22 includes a radially projecting rib 56 having a flat or planar end surface 58. In the disclosed embodiment, the rib 56 has a generally cylindrical outer surface, including a plurality of generally equally spaced transverse channel-shaped depressions 60. In the embodiment of the brake actuator shown, the rib 56 includes twelve channel-shaped depressions 60 as shown in FIG. 2; however the number of depressions will depend upon the diameter of the brake actuator and at least ten equally spaced depressions is preferred. As best shown in FIG. 3, the diameter of the internal surface 41 of the tubular end portion 26 of the cup-shaped cover 24 is initially less than the diameter of the cylindrical external surface of the radially projecting rib 56, providing an interference fit. In a typical application where the inside diameter of the internal surface 41 is 6.5", the interference fit is about 0.020" to 0.030". However, it will be understood that the preferred interference fit will depend upon the diameters of the internal surface 41 of the cover and the external surface of the rib 56, the configuration of the transverse channel-shaped depressions 60 and the respective materials of the cover and housing member. Nevertheless, as will be understood from FIG. 3, it would be difficult to press fit the tubular open end 26 of the cover 24 over the radial projecting rib 56 without damaging the housing member 22, particularly where the housing member 22 is formed of aluminum and the cover 24 is formed of steel, unless some means is provided to expand or enlarge the internal diameter of the cover or compress the rib.

Figure 5:
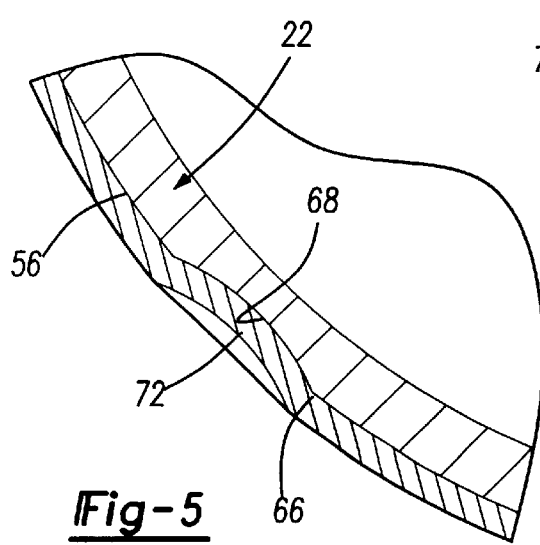
FIG. 5 is a cross-sectional view of FIG. 4 in the direction of view arrows 5—5.

The preferred configuration of the channel-shaped depressions 60 is generally cylindrical having an open end 62 facing the end 64 of the housing member, side walls 66 tapered toward the open end 62 and an arcuate or cylindrical bottom wall 68 best shown in FIGS. 2 and 5. As shown in FIG. 2, however, the diameter of the rib 56 measured at the radial inner extent of the bottom walls 68 of the depressions 60 is actually initially less than the internal diameter of the tubular end portion 26 of the cover, such that the tubular end portion will stretch over the radially projecting rib 56 between the channel-shaped depressions as the tubular end portion is pressed telescopically over the rib. When the tubular open end 26 of the housing member 24 is pressed telescopically over the radial rib 56 the tubular end 26 of the cover is simultaneously channeled and deformed radially inwardly into the transverse channel-shaped depression 60 as shown in FIGS. 2 and 5 and radially expanded over the radially projecting rib 56 as shown in FIG. 4. That is, the open end 62 and tapered side wall 66 of the radial depressions 60 channel the tubular open end 26 of the cover radially inwardly, guiding and permitting radial expansion of the tubular end portion over the radial rib as shown at 70 in FIG. 4.

It should be noted that FIG. 4 is somewhat exaggerated. Actual testing and measurement has shown that the radial rib 56 of an aluminum case for example is simultaneously compressed and rounded as the open end 26 of the head stretches or expands over the rib. Although the expanded area 70 is not noticeable, measurement indicates that the open end 26 of the head expands and the rib 56 is simultaneously compressed. The open end 26 of the head may also be slightly flared to facilitate telescoping the head over the rib. For ease of description, this will be described as stretching or expanding the open end of the cover over the rib 56, although the rib may be simultaneously compressed or the rib may be compressed sufficiently to receive the head with little or no expansion of the head.

This method of assembling the cover 24 on the housing member 22 provides several important advantages for the brake actuator of this invention. First, the inwardly radially deformed portions 72 (see FIG. 5) prevent turning of the cover 24 relative to the housing member 22 thereby exceeding the torque requirement for such brake actuators. In the prior embodiment shown in the above-referenced U.S. Pat. No. 5,676,036, the cover 24 could turn or rotate relative to the housing member 24, sometimes destroying the seal 54 shown in FIGS. 3 and 7. The seal has been removed in certain figures for clarity. Further, the interference fit between the tubular end portion 26 of the cover and the radial rib 56 of the housing member provides an improved seal and a secure assembly, particularly where the housing member 22 and the cover 24 are formed of different materials having different coefficients of expansion. As will be understood by those skilled in the art of brake actuators, such brake actuators are subject to extreme temperature variations and the interference fit assures a tight assembly even under such extreme conditions.

Figure 6:
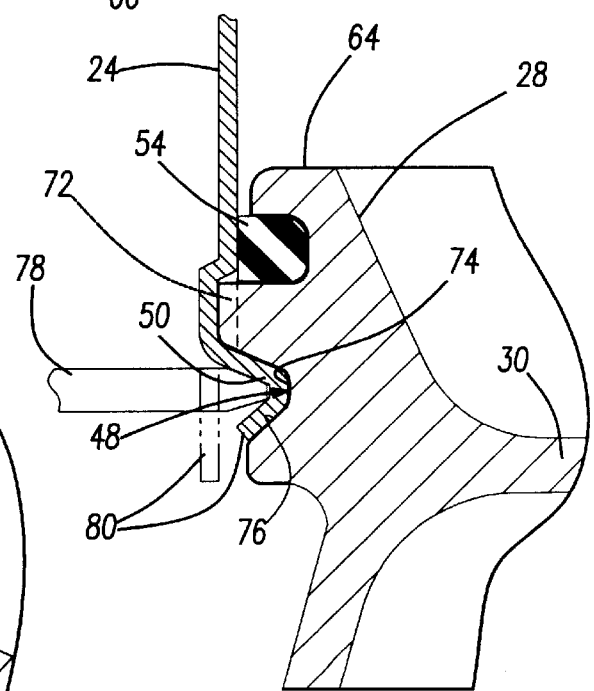
FIG. 6 is a side partially cross-sectioned view similar to FIG. 4 following radial deformation of the tubular end portion of the cover into the retaining groove.

The most preferred embodiment of the brake actuator of this invention is tamper-resistant. That is, manufacturers of brake actuators now prefer to permanently seal the cover 24 on the housing member 22 to avoid inadvertent opening of the emergency chamber 32 and release of the power spring 36 shown in FIG. 7. However, in the brake actuator 20 of this invention, the cover 24 may be secured to the housing member 22 by any suitable means including, for example, deforming a radial skirt over a radial flange as shown for example in the above-referenced U.S. Pat. No. 4,960,036. However, in the preferred embodiment shown in FIG. 6, the tubular end portion 26 is preferably deformed radially inwardly into a groove 48 as shown at 50 in FIG. 7 and described in more detail in regard to FIG. 6 as follows. As shown in FIG. 6, the preferred embodiment of the retaining groove 48 includes a bottom wall 74 and outwardly inclined side walls 76. The radial rib 56 is preferably located between the seal groove 54 of the housing member 22 and the retaining groove 48. Following pressing of the free open end 26 of the cover 24 over the radial rib 56 as shown in FIG. 4, the tubular end portion 26 of the cover is deformed radially inwardly into the retaining groove 48 by a conventional forming tool 78, such that the central portion 50 is deformed into the groove 48 against the bottom wall 74 as shown. Simultaneously, the free end 80 of the tubular end portion 26 is deformed radially outwardly to overlie the outer side walls 76 of the groove 48, as shown. As will be understood, however, the free end 80 will spring back to some extent following forming, such that the free end overlies but generally does not contact the outer inclined side wall 76. The resultant tamper-resistant connection between the cover 24 and the housing member 22 thus reduces the size of the envelope of the brake actuator of this invention and provides an additional advantage particularly in combination with the anti-rotation function. As shown in FIG. 1, the open end 65 of the service chamber portion 22 of the housing member includes a radial lip to facilitate attachment of a cover (not shown) enclosing the service chamber; however the cover of the service chamber may also be attached to the housing member by the method of this invention.

The method of this invention then includes forming a metal housing member 22 having an open end 28, an annular radially projecting rib 56 adjacent to and surrounding the open end of the housing member having a plurality of spaced channel-shaped transverse depressions 60 in the radial rib extending toward the open end of the housing member; forming a cup-shaped metal cover 24 including a tubular open end portion 26 having an inside diameter at 41 less than an outside diameter of the annular rib 56 of the housing member; and pressing the tubular open end portion 26 of the cover telescopically over the annular radial rib 56 of the housing member, permanently deforming the tubular open end portion of the cover radially into the channel-shaped transverse depression 60, thereby preventing rotation of the cover 24 relative to the housing member 22. As described above, and shown in FIG. 3, the inside diameter of the tubular end portion 26 of the cover preferably is larger than the diameter of the rib 56 measured across the bottom walls 68 of the channel-shaped depressions. The method of this invention further includes stretching the tubular end portion 26 of the cover over the radial rib 56 as the tubular end portion is deformed radially inwardly into the channel shaped depressions 60. In the most preferred embodiment of the method of this invention, the tubular end portion 26 is deformed into the retaining groove 48 following assembly of the cover 24 on the housing member 22. The resultant brake actuator 20 has improved sealing characteristics particularly under extreme temperature conditions.

As will be understood by those skilled in the art, various modifications may be made to the improved brake actuator and method of this invention within the purview of the appended claims. For example, the housing member 22 may also be formed of steel and the method of this invention may be utilized to securely retain the cover of a diaphragm-type spring brake actuator or the cover of a service chamber on a housing of a brake actuator in tandem or where the components are separated as described above. The improved brake actuator and method of this invention, however, has additional advantages when utilized to secure the head or cover on a housing member of a spring chamber which requires a more secure attachment because of the forces generated and the inherent dangers of a power spring.

What is claimed is:

1. A method of retaining a cup-shaped cover on a housing member of a brake actuator, comprising:

forming a metal housing member having an open end, an annular radial projecting rib adjacent to and surrounding said open end and a plurality of spaced channel-shaped transverse depressions in said radial rib extending toward said open end of said housing member;

forming a cup-shaped metal cover including a tubular open end portion having an inside diameter less than an outside diameter of said annular radial rib of said housing member; and pressing said tubular open end portion of said cover telescopically over said annular radial rib of said housing member, permanently deforming said cover tubular open end portion radially into said spaced channel-shaped transverse depressions, thereby preventing rotation of said cover relative to said housing member.

2. The method of retaining a cup-shaped cover on a housing member of a brake actuator as defined in claim 1, wherein said method includes forming a bottom wall in each of said depressions in said radial rib wherein the diameter of said radial rib measured between said bottom walls of said depressions is less than said inside diameter of said tubular end portion of said cover.

3. The method of retaining a cup-shaped cover on the housing member of a brake actuator as defined in claim 1, wherein said method includes forming said plurality of spaced channel-shaped transverse depressions in said annular rib of said housing member having an open end and side walls tapering toward said open end of said depressions, said open end and tapered side walls of said depressions channeling said tubular open end portion of said cup-shaped metal cover into said depressions as said tubular open end portion of said cover is pressed telescopically over said annular radial rib of said housing member.

4. The method of retaining a cup-shaped cover on the housing member of a brake actuator as defined in claim 3, wherein said method includes forming a concave arcuate bottom wall in said channel-shaped longitudinal depressions.

5. The method of retaining a cup-shaped cover on the housing member of a brake actuator as defined in claim 1, wherein said method includes forming an annular concave radial groove in said housing member adjacent said annular rib with said annular rib located between said radial groove and said open end of said housing member, telescopically pressing said tubular end portion of said cover over said radial groove of said housing member and then permanently deforming said tubular end portion of said cover radially into said annular groove, permanently attaching said cover on said housing member.

6. The method of retaining a cup-shaped cover on the housing member of a brake actuator as defined in claim 5, wherein said method includes forming said annular concave radial groove in said housing member having a bottom wall and a tapered side wall spaced away from said radial rib, including permanently deforming said tubular end portion of said cover radially outwardly to overlie said side wall.

7. A method of retaining a cup-shaped cover on a housing of a brake actuator, comprising the following steps:

forming a metal housing an open end, an annular radial rib adjacent said open end of said housing and a plurality of generally equally spaced channel-shaped transverse depressions in said annular rib each having a bottom wall;

forming a cup-shaped metal cover including a tubular open end portion having an initial inside diameter less than an outside diameter of said annular radial rib of said housing but greater than a diameter of said annular rib measured between said bottom walls of said channel-shaped transverse depressions and a free end;

pressing said tubular open end portion of said cover telescopically over said annular radial rib of said housing thereby simultaneously stretching said tubular end portion of said cover over said radial rib and radially inwardly into said channel-shaped depressions, thereby preventing rotation of said cover relative to said housing; and securing said free end of said tubular end portion of said cover to said housing.

8. The method of retaining a cup-shaped cover on a housing of a brake actuator as defined in claim 7, wherein said method includes forming said plurality of generally equally spaced channel-shaped transverse depressions in said annular rib of said housing having side walls tapering toward an open end of said depressions, said open end and said tapered side walls of said depressions channeling said tubular open end portion of said cup-shaped metal cover into said depressions and over said radial rib of said housing as said tubular end portion of said cover is pressed telescopically over said annular radial rib of said housing.

9. The method of retaining a cup-shaped cover on a housing of a spring brake actuator as defined in claim 8, wherein said method includes forming a concave arcuate bottom wall in said depressions guiding said tubular end portion of said cover telescopically into said depressions and over said annular radial rib.

10. The method of retaining a cup-shaped cover on a housing of a spring brake actuator as defined in claim 7, wherein said method includes forming an annular concave radial groove in said housing adjacent said annular rib with said rib located between said radial groove and said open end of said housing, then pressing said tubular end portion of said cover adjacent said free end telescopically over said radial groove of said housing and then permanently deforming said tubular end portion adjacent said free end radially inwardly into said annular groove, permanently attaching said cover on said housing.

11. The method of retaining a cup-shaped cover on a housing of a spring brake actuator as defined in claim 10, wherein said method includes forming said radial groove in said housing having a bottom wall and a tapered side wall spaced away from said radial rib, including permanently deforming said tubular end portion of said cover adjacent said free end radially outwardly to overlie said tapered side wall.

12. A method of retaining a cup-shaped cover on a housing member of a spring brake actuator, comprising the following steps:

forming an aluminum housing member having an open end, a radial concave groove generally surrounding said housing member open end and an annular radial projecting rib located between said groove and said open end having a plurality of generally equally spaced channel-shaped transverse depressions in said annular radial rib having an opening end opening toward said housing member open end;

forming a cup-shaped steel cover including a tubular open end portion having an inside diameter initially less than an outside diameter of said annular radial rib of said housing member and a free end;

pressing said tubular end portion of said cover telescopically over said annular radial rib of said housing member, thereby simultaneously stretching said tubular end portion of said cover over said radial rib and radially inwardly into said channel-shaped transverse depressions, thereby preventing rotation of said cover relative to said housing member; and permanently deforming said tubular open end portion of said cover adjacent said free end into said radial concave groove in said housing member, permanently securing said tubular end portion of said cover to said housing member.

13. The method of retaining a cup-shaped cover on a housing member of a spring brake actuator as defined in claim 12, wherein said method includes forming said plurality of generally equally spaced channel-shaped transverse depressions in said annular radial rib each having side walls tapering toward said open end of said depressions, said open end and tapered side walls of said depressions channeling said tubular end portion of said cover into said depressions as said tubular end portion is telescopically received over said radial rib of said housing member.

14. The method of retaining a cup-shaped cover on a housing member of a spring brake actuator as defined in claim 12, wherein said method includes forming a tapered side wall in said concave radial groove spaced away from said radial rib of said housing member, including permanently deforming said tubular end portion of said cover adjacent said free end radially outwardly to overlie said tapered side wall of said groove.

15. A spring brake actuator, comprising:

a metal housing member having an open end and a radial projecting rib adjacent to and generally surrounding said open end, said radial projecting rib having a plurality of spaced channel-shaped transverse depressions each having an open end opening toward said housing member open end;

a cup-shaped metal cover including a tubular open end portion having a free end, said tubular open end portion of said cover telescopically received over said radial projecting rib of said housing member and said tubular end portion inelastically deformed radially inwardly into said channel-shaped depressions and stretched over said radially projecting rib, and said free end of said tubular end portion of said cover secured to said housing member.

16. The spring brake actuator defined in claim 15, wherein said spaced channel-shaped transverse depressions in said annular rib of said housing each include side walls tapering toward said open end of said depressions.

17. The spring brake actuator defined in claim 16, wherein said channel-shaped transverse depressions in said annular projecting radial rib of said housing member each include a concave arcuate bottom wall.

18. The spring brake actuator defined in claim 15, wherein said housing member includes an annular concave radial groove adjacent said annular projecting radial rib with said rib located between said radial groove and said open end of said housing member and wherein said tubular end portion of said cover is deformed radially inelastically into said annular concave radial groove in said housing member permanently attaching said cover to said housing member.

19. The spring brake actuator defined in claim 18, wherein said concave radial groove in said housing member includes a bottom wall and a tapered side wall spaced away from said radial projecting rib and said tubular end portion of said cover adjacent said free end is deformed radially outwardly to overlie said tapered side wall of said groove.

20. A spring brake actuator, comprising:
- a central housing member for defining a spring chamber on a first side and a service chamber on a second side and an open end on said first spring chamber side, said open end having an annular radially projecting rib surrounding said open end having a plurality of spaced channel-shaped transverse depressions, each depression having an open end opening toward said open end of said central housing member;
- a spring cover housing member having a tubular open end portion initially having an inside diameter less than an outside diameter of said annular projecting radial rib of said central housing member, said tubular open end portion of said spring cover housing member telescopically received over said radially projecting rib of said central housing and inelastically deformed radially inwardly into said channel-shaped transverse depressions and stretched over said annular radially projecting rib and said free end of said spring cover housing member secured to said central housing member.

21. The spring brake actuator defined in claim 20, wherein said channel-shaped transverse depressions in said annular projecting radial rib each include side walls tapering toward said open end of said depressions.

22. The spring brake actuator defined in claim 21, wherein each of said channel-shaped transverse depressions include a concave arcuate bottom wall.

23. The spring brake actuator defined in claim 20, wherein said open end of said central housing member includes a concave securement groove with said radially projecting rib located between said open end of said central housing member and said concave securement groove and said tubular end portion of said spring brake cover housing member inelastically deformed radially into said concave securement groove.

24. The spring brake actuator defined in claim 20, wherein said central housing member is formed of aluminum and said spring brake cover housing member is formed of steel.

25. A spring brake actuator comprising:
- an aluminum housing member having a generally cylindrical open end, a concave securement groove generally surrounding said open end and a radially projecting rib located between said securement groove and said open end, said radially projecting rib including a plurality of generally equally spaced channel-shaped transverse depressions, each depression having an open end opening toward said housing member open end;
- a cup-shaped steel cover including a tubular open end initially having an inside diameter less than an outside diameter of said radially projecting rib of said housing member;
- said tubular portion of said cover telescopically received over said radially projecting rib of said housing member and inelastically deformed radially inwardly into said channel-shaped depressions and stretched over said radially projecting rib and radially inwardly into said concave securement groove of said housing member.

* * * * *